June 16, 1953     A. D. CAMPBELL     2,642,029
ICE-CREAM CONE DIPPING APPARATUS

Filed Feb. 28, 1949     4 Sheets-Sheet 1

Inventor
ARCHIE D. CAMPBELL

HIS ATTY.

June 16, 1953  A. D. CAMPBELL  2,642,029
ICE-CREAM CONE DIPPING APPARATUS
Filed Feb. 28, 1949  4 Sheets-Sheet 2
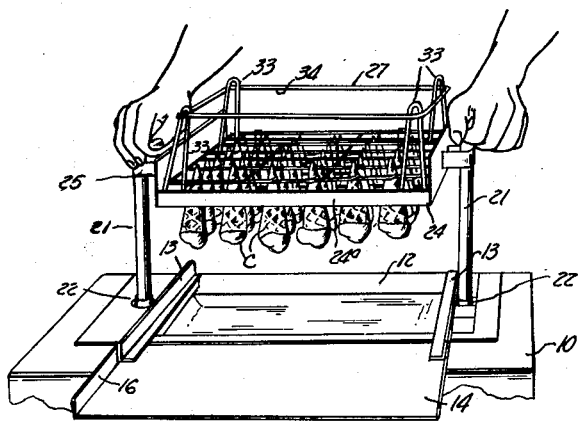
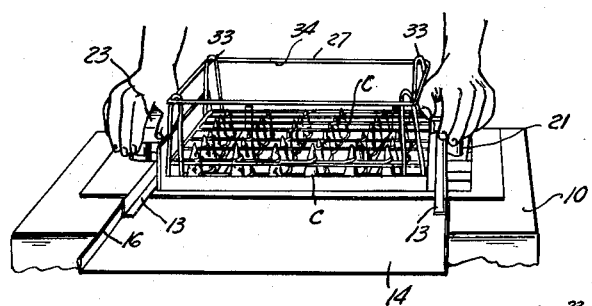
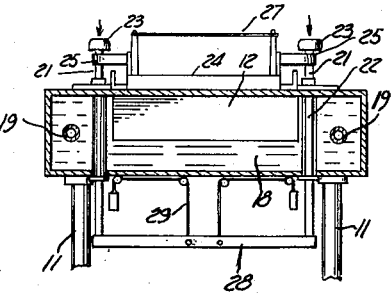
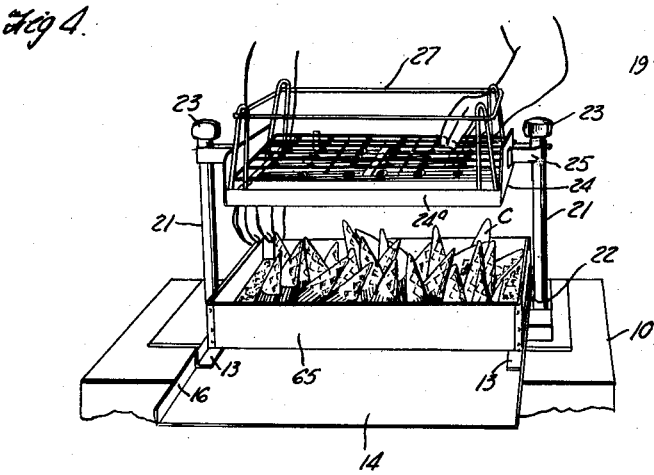
Inventor
ARCHIE D. CAMPBELL
By
HIS ATTY.

June 16, 1953  A. D. CAMPBELL  2,642,029
ICE-CREAM CONE DIPPING APPARATUS
Filed Feb. 28, 1949  4 Sheets-Sheet 3
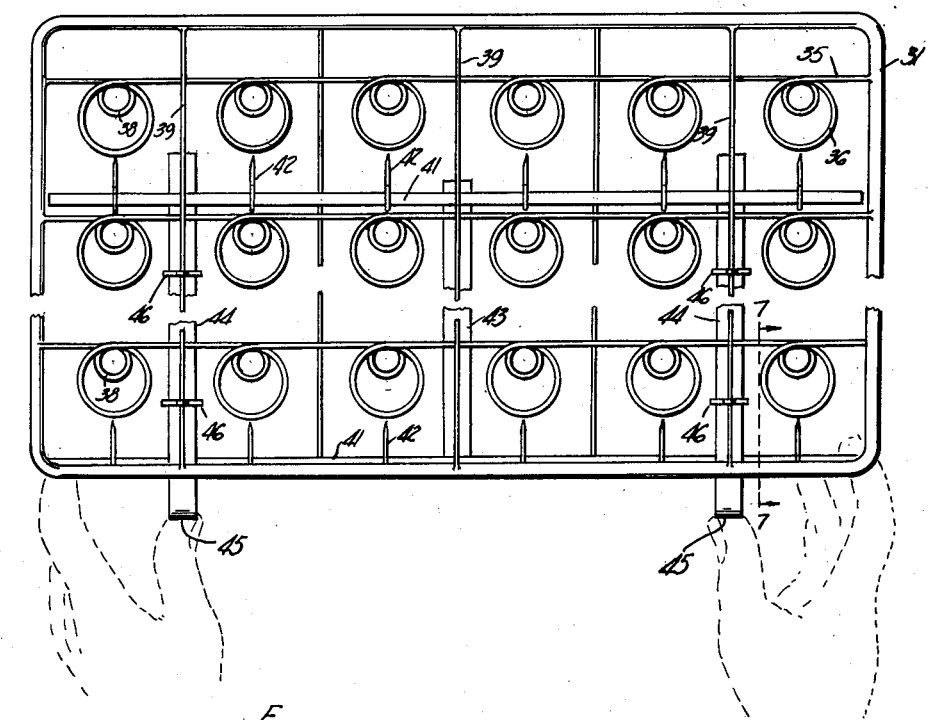
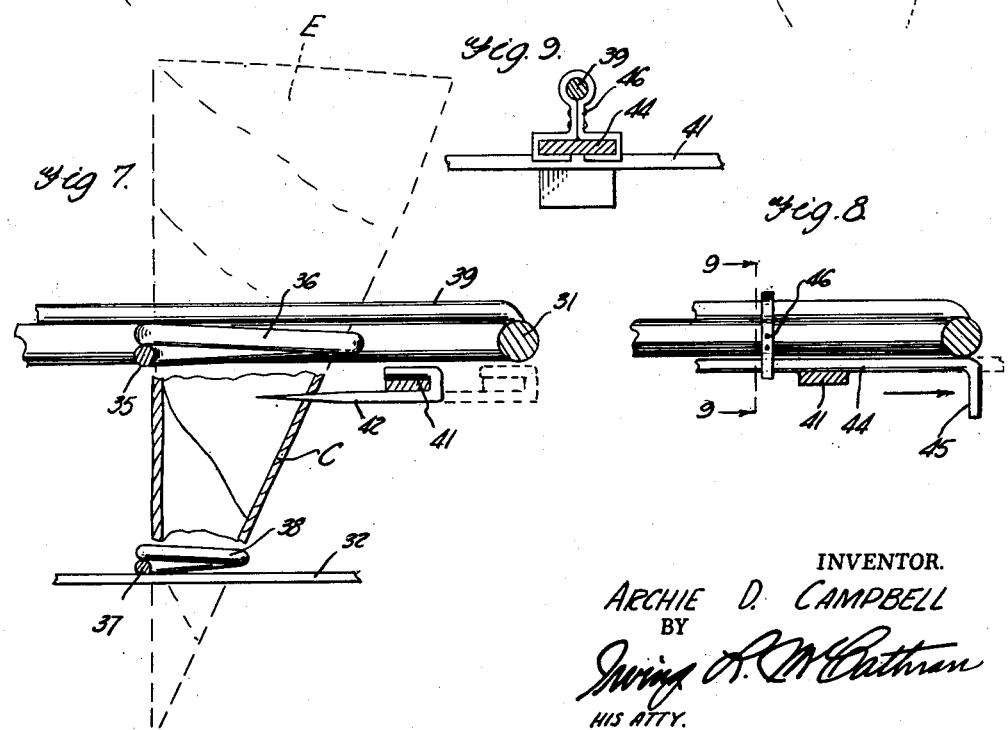
INVENTOR.
ARCHIE D. CAMPBELL
BY
HIS ATTY.

June 16, 1953 — A. D. CAMPBELL — 2,642,029
ICE-CREAM CONE DIPPING APPARATUS
Filed Feb. 28, 1949 — 4 Sheets-Sheet 4
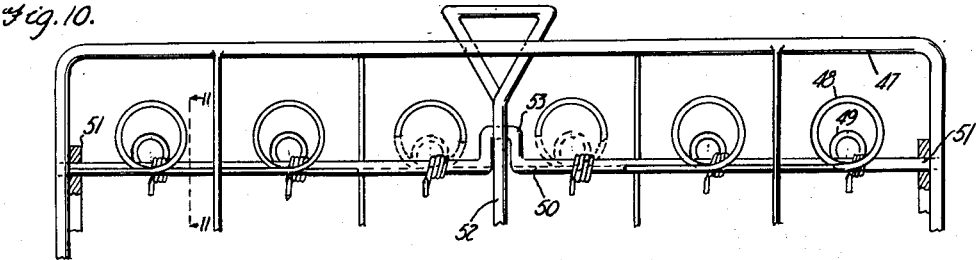
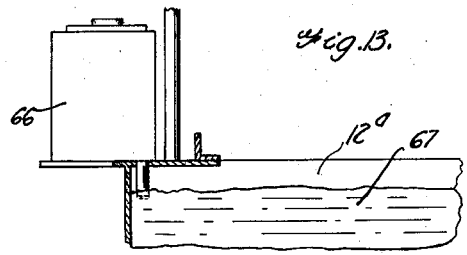
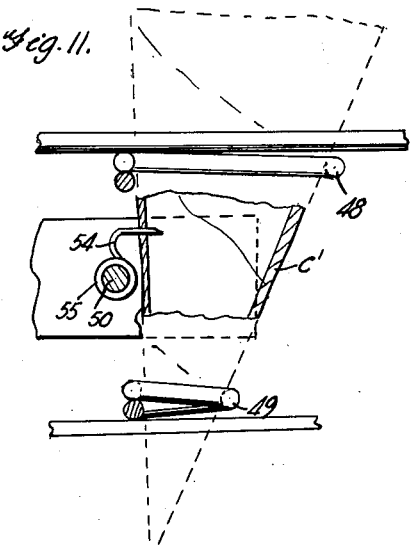
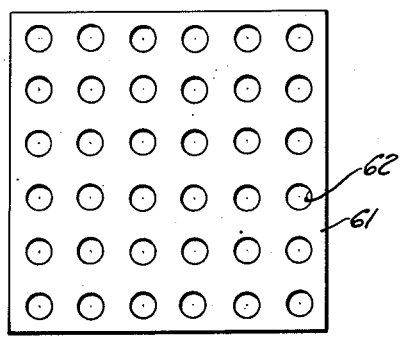
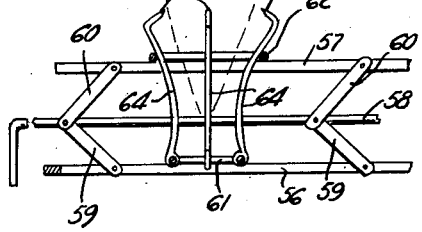
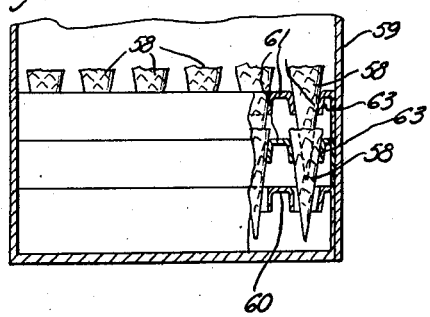
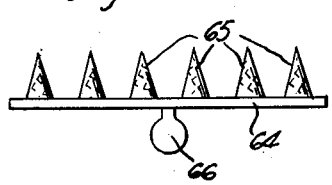
INVENTOR.
ARCHIE D. CAMPBELL
BY
HIS ATTY.

Patented June 16, 1953

2,642,029

UNITED STATES PATENT OFFICE 2,642,029

ICE-CREAM CONE DIPPING APPARATUS

Archie D. Campbell, Whiting, Ind.

Application February 28, 1949, Serial No. 78,824

2 Claims. (Cl. 118—30)

1

This invention relates to an ice cream cone dipping apparatus, and has for one of its objects the production of a simple and efficient means for facilitating the dipping of ice cream cones in a tank for coating the ice cream carried by the cone, with a coating of chocolate or other desired coating, and the dropping the cone into a tray of ground nuts or other edible material, so that the nuts will adhere to the chocolate or other coating, as the coating is solidified by the cold ice cream itself.

A further object of this invention is the production of a simple and efficient basket or rack for supporting ice cream cones for the purpose of dipping, the basket or rack having means for facilitating the release of the cones in a manner whereby the ice cream filled and dipped cones may be dropped into a receptacle containing chopped or ground nuts and the like for picking up the nut particles as the coating is solidified by the cold ice cream.

Other objects and advantages of the present invention will appear throughout the following specification and claims.

In the drawings—

Figure 2 is a perspective view of the dipping tank, showing the basket in position upon its support prior to dipping the cones;

Figure 3 is a view similar to Figure 2, showing the basket in a cone dipping position;

Figure 4 is a perspective view of the dipping tank, showing the basket in an elevated position, the cones having been released;

Figure 5 is a front elevational view of the apparatus showing the front portion of the dipping tank supporting table in vertical position;

Figure 6 is a fragmentary top plan view of the cone supporting basket;

Figure 7 is a fragmentary sectional view taken on line 7—7 of Figure 6, showing the cone engaging pin in an engaging position in full lines and in a disc engaging position in dotted lines;

Figure 8 is a fragmentary sectional view taken on line 8—8 of Figure 6, showing the actuating bar in an inner position;

Figure 9 is a vertical sectional view taken on line 9—9 of Figure 8;

Figure 10 is a fragmentary top plan view of a modified form of basket, showing a modified type of cone anchoring means;

Figure 11 is an enlarged fragmentary sectional view taken on line 11—11 of Figure 10;

Figure 12 is a fragmentary side elevational view, partly in section showing a modified type of cone supporting and anchoring means;

Figure 13 is a fragmentary vertical sectional

Figure 1:
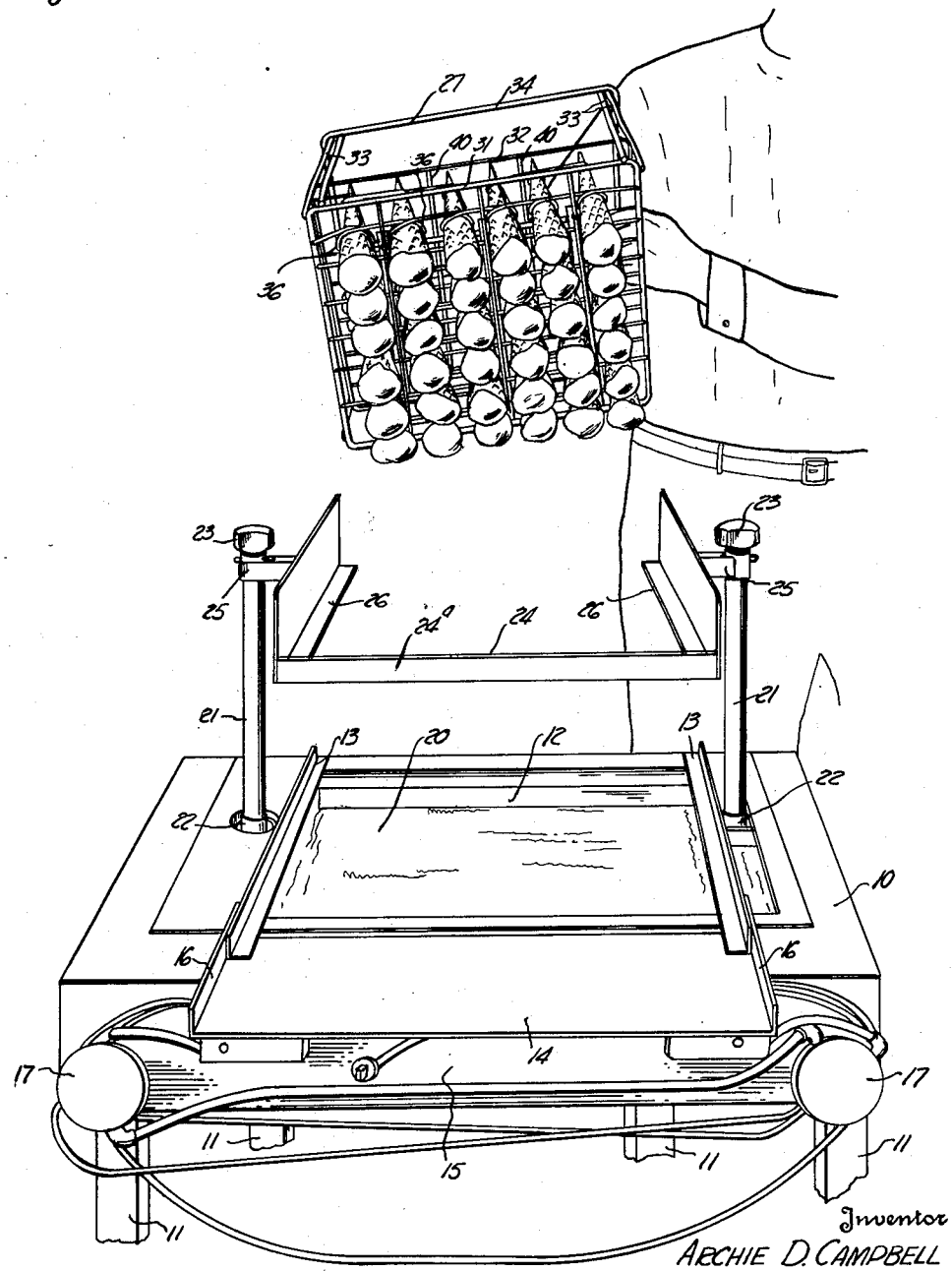
Figure 1 is a perspective view of the apparatus illustrating the manner in which the ice cream cone supporting basket is held prior to placing the basket upon the dipping apparatus.

2 view of a modified type of tank, showing a vacuum reservoir mounted thereon for replenishing the coating liquid in the tank;

Figure 14 is a top plan view of a cone supporting tray which is used in connection with the present invention;

Figure 15 is a vertical sectional view of a carrying receptacle showing a plurality of trays carried by the receptacle, portions of the trays being shown in section;

Figure 16 is a side elevational view of the cone transfer tool.

By referring to the drawings, it will be seen that 10 designates a table or other support having legs 11 of a suitable type. A tank 12 is suspended in the table 10 in any suitable manner below the top surface of the table 10. A pair of angle track rails 13 extend forwardly and rearwardly across the top surface of the table 10 upon opposite sides of the tank 12, as shown in Figure 1. An extension plate 14 fits under the forward or front ends of the rails 13 and projects beyond the front face 15 of the table 10. The plate 14 is provided with upstanding parallel flanges which abut the front ends of the rails 13 to anchor the extension plate 14 against lateral displacement. The table 10 comprises a water jacket casing 18 and suitable heater fittings 17 of a suitable type are carried by the front face of the table 10, as shown in Figure 1. These heater fittings 17 support suitable conventional temperature control elements 19 which may be of any desired type extending into the water jacket of the table to maintain the water in the water jacket at a proper temperature and thereby prevent the coating material 20 in the tank 12 properly liquefied to coat the ice cream in the cones when the cones are dipped therein.

A plurality of reciprocating upright actuating tubes or standards 21 are slidably mounted through the vertical guides 22, which guides 22 extend vertically through the table 10 upon opposite sides of and beyond the tank 12. Hand engaging knobs 23 are carried by the upper ends of the actuating tubes 21.

An open bottom basket supporting tray or rack 24 is connected at each side thereof to the tubes or standards 21 by means of suitable connecting members 25. The tray or rack 24 is provided with inwardly extending horizontal flanges 26 to provide supporting rails upon which the cone carrying basket 27 is adapted to slidably rest. The tray or rack 24 is open at one end, as shown in Figure 1, and is provided with an abutment strip 24ª against which the basket 27 is adapted to abut, as the basket is placed upon the flanges 26 and slidably moved to a correct position of abutment with the strip 24ª. This strip 24ª constitutes a gauge strip to locate the basket 27 in a correct dipping position. The lower ends of the tubes or standards are preferably connected to a transverse brace 28, which also extends transversely under the table 10. Cables or other flexible elements 29 are connected to this brace 28, and these cables 29 pass over suitable guiding pulleys located at any suitable location below the table. Sash weights or counter weights 30 are carried by the opposite ends of the cable 29 to return the tubes or standards to an elevated position when pressure of the operator's hands is released therefrom, as will be hereinafter described. Springs of a conventional type may be substituted for the counterweights without departing from the spirit of the invention, or any other means may be employed to return the tubes 21 and rack or tray 24 to an elevated position when it is released.

The basket 27 preferably is formed of heavy wire and is preferably square in shape. This basket 27 comprises an outer frame 31 and an inwardly spaced frame 32, which are connected at the corners thereof by corner braces 33, the outer ends of the braces 33 being connected by a reinforcing heavy wire bracing member 34. A plurality of transversely extending and longitudinally spaced wires 35 are carried by the outer frame 31 and a plurality of spaced relatively large cone receiving convolutions 36 are formed within the length of each wire 35. A plurality of transversely extending and longitudinally spaced wires 37 are carried by the inner frame 32 and are in vertical alignment with the wires 35. A plurality of convolutions 38 which are relatively smaller than the loops or convolutions 36 are formed within the length of each wire 37, in vertical alignment with the convolutions 36, and have the axis thereof in offset vertical alignment with the axis of the convolutions 36, as shown in detail in Figure 7. This arrangement will support the spirally formed cone C in a position to extend its upper open end E horizontally and in a manner to prevent the ice cream placed in the open end of the cone from rolling out while the cone is being filled.

The wires 35 are braced by suitable cross wires 39, which also are anchored to the frame 31, and the wires 37 also are anchored suitably to the frame 32. The corner braces 33 will constitute supporting legs for the trays 27 when they are stacked one upon the other for storage purposes.

A needle carrying bar 41 carrying a plurality of right-angularly extending needles 42 extends transversely across the basket 27 in front of each row of convolutions and in a position directly below the upper convolutions 36 intermediate the upper convolutions 36 and the lower convolutions 38, so as to cause the needles 42 to pierce the cone C intermediate the upper and lower convolutions, in close proximity to the upper convolutions, as shown in Figure 7. The bars 41 are connected by a longitudinal central tie bar 43 and a pair of end actuating tie bars 44. The actuating bars 44 are provided with angle ends 45 in the nature of handles or thumb-engaging members to facilitate shifting of the bars 41 to and from a position to move the needles 42 into and out of penetrating engagement with the cones C. As the actuating bars 44 are moved inwardly, the needles 42 will penetrate the cones C to firmly hold the cones C in position within the convolutions 36 and 38 of the basket 27 and prevent the cones C from dropping from the basket 27, when the basket 27 is inverted as shown in Figures 1 to 4 inclusive. Hanger clips 46 tie the bars 44 to the braces 39, as shown in Figures 6, 8 and 9, and are properly spaced to support the bars 44 and permit the bars 44 to be moved to and from a cone-locking position.

In Figures 10 and 11 there is shown a modified type of cone locking mechanism, wherein a basket 47 having cone supporting convolutions 48 and 49 is provided similar to the structure shown in Figure 6. However, in this form, the locking mechanism comprises an oscillating shaft 50 which is journalled at its ends, as at 51. An actuating rod 52 is movable across the frame 47 and is connected to the shaft 50 by means of a crank portion 53. Cone engaging hooks 54 are fastened at properly spaced intervals along the shaft 50 by means of the convolutions 55 which are coiled around and fastened to the shaft 50, as shown in detail in Figures 10 and 11. These hooks 54 are pointed and as the shaft 50 is rotated in one direction, the hooks 54 will penetrate the cone C', and anchor the cone in place. By reversing the movement of the shaft 50, the hook 54 will be withdrawn to release the cone C'.

As shown in Figure 12, a further modified form of cone gripping means is shown comprising a base 56, an upper frame 57, and an actuating bar 58. Toggle links 59 and 60 are pivotally connected to the bar 58 at their inner ends and the links 59 are pivotally connected at their outer ends to the base 56. The links 60 are pivotally connected at their outer ends to the frame 60. A ring 61 is fixed to the base 56 and a plurality of outwardly flared spring arms 64 are secured at their lower ends to this ring 61. A closure ring 62 is carried by the frame 57 and surrounds the upper flared ends of the arms 62. Each arm 64 is provided with an inturned pointed terminal 63. A cone, shown in dotted lines in Figure 12 is set between the arms 64, and as the bar 58 is pushed inwardly, the frame 57 is elevated and the ring 62 by passing vertically of the arms 64, will draw the arms 64 together and force the pointed terminals into the cone to lock the cone in position. A reversal of the movement of the bar 58 will lower the ring 62, and the spring nature of the arms 64 will spread the arms 64 apart and withdraw the prongs 63 to release the cone.

By referring particularly to Figures 1 to 4 inclusive, it will be seen that the basket 27 is initially held by the operator with the basket suspending the cones in an inverted position, as shown in Figure 1. The basket 27 is then placed upon the rack or tray 24, the sides edges of the basket 27 resting on the flanges 26. The front end of the tray 24 is provided with an abutment strip 24ª against which the front portion of the basket 27 abuts when the basket 27 is placed upon the flanges 26. The rear portion of the tray 24 is open, as shown in Figure 1, to facilitate the placing of the basket in position upon the tray 24 and to facilitate the removal of the tray 24.

After the tray 27 is placed in position, upon the tray 24, the operator places his hands upon the knobs 23 and presses the actuating tubes or standards 21 downwardly, thereby moving the tray 24, which supports the inverted cone carrying basket 27 downwardly into the tank 12, as shown in Figure 3. The outer ends of the cones C which carry the ice cream filling are in this way immersed in the chocolate coating to cover the cones and ice cream at the outer ends of the cones with the chocolate coating. After holding the tray 24 in a depressed position momentarily or for a sufficient time to coat the cones C, pressure upon the actuating tubes or standards 21 is released or relieved by the hands of the operator and the standards or tubes 21 will automatically return to a raised position to lift the cone carrying basket 27 and tray 24 from the cone dipping position. The cold temperature of the ice cream in the cones will tend to solidify the chocolate coating.

After the basket 27 and tray 24 are raised to an elevated position, a tray or receptacle 65 containing chopped nuts or other similar or desired edible material is placed upon the plate 14 and slid inwardly upon the trackway flanges 13 to a position under the tray 24 and the basket 27 above the tank 12 as shown in Figure 4. The operator then pulls the angle ends 45 of the bars 44 outwardly of the basket 27 thereby pulling the bars 41 and needles 42 to a retracted position out of engagement with the cones C. Since the basket 27 and the cones C are in an inverted position, the cones will automatically drop into the chopped nuts within the tray or receptacle 65, and these chopped nuts will adhere to the chocolate coating which has become partly chilled in the nature of a semi-soft icing or coating. The tray or receptacle 65 may then be removed and the dipping operation continued with other cones. The cones C may at a proper time or after a suitable interval, be picked up from the tray 65 and may be placed in bags for further refrigeration preparatory for distribution and sale.

It should be understood that the cones illustrated are penetrated near the top thereof, where the cone is thin and the circular section is much larger. By penetrating the cone at this point, it has been found that practically no breakage occurs, whereas, when the cones are penetrated near the lower end where the cone is thick, considerable breakage occurs. By placing the needles near the top of the basket as shown in Figure 7, the needles will pierce the cone at a point where the cone is thin, and the circular portion is of greater diameter than at its lower end.

Should the form of cone engaging means shown in Figures 1 and 11 or in Figure 12 be used, the cones are released by actuating the mechanism previously described in connection with the structure illustrated.

As shown in Figure 13, the tank 12a, similar to the tank 12 may be fed by a vacuum feed tank or reservoir 66, having a liquid outlet pipe normally extending below the liquid level of the tank 12a to maintain the chocolate or other liquefied coating 67 at a constant level.

For the purpose of facilitating the storage and the handling of the unfilled cones such as the cones 68 shown in Figure 15, I preferably provide a suitable container 59 in which is removably mounted a bottom tray 60 and any desired number of other cone carrying trays 61 which are arranged in stacked relation. The trays 61 are provided with apertures 62 having depending flanges 63 for receiving and supporting the cones 58. The bottom tray 60 is constructed in a manner similar to the trays 61.

For the purpose of transferring the empty cones from the trays 60 and 61, I preferably employ a transfer tool 64. This tool comprises a flat panel the size and shape of the tray 61 having a plurality of cone-like protruding members 65 upon one face thereof, and a suitable handle or knob 66 on the opposite side. This tool 64 is adapted to be placed over one of the trays such as the tray 61, so that the protruding members 65 are inserted into the cones 58 carried by the tray.

The tool is then inverted with the cones fitting upon the protruding members 65, and the tray 27 may be placed over the cones and the tool 64 and tray 27 are again inverted to fit the cones in the convolutions of the tray 27. In this way the cones need not be individually handled by the operator and the cones need not be touched by the hands of the operator.

It should be understood that certain detail changes in the construction of the device may be employed without departing from the spirit of the invention so long as such changes fall within the scope of the appended claims.

Having described the invention, what is claimed as new is:

1. An apparatus of the class described comprising a support, a tank for a liquid coating material carried by the support, a basket carrying tray mounted upon said support for reciprocating movement toward and away from said tank, said tray having an open end, an abutment strip closing the opposite end of the tray, basket supporting flanges carried by said tray, a removable cone carrying basket adapted to be carried by said tray and slidably engaging said flanges, said basket supporting ice cream filled cones in an inverted releasable position when the basket rests upon said tray, said tray being adapted to be depressed for dipping the ice cream filled inverted end of the cones into the coating material in said tank, and said basket carrying tray being movable to an elevated position to withdraw the cones from said tank.

2. An apparatus of the class described comprising a support, a tank for a liquid coating material carried by the support, a basket carrying tray mounted upon said support for reciprocating movement toward and away from said tank, said tray having an open end, an abutment strip closing the opposite end of the tray, inwardly extending horizontal basket supporting flanges carried by said tray, a removable cone carrying basket adapted to be carried by said tray and slidably engaging said flanges, said basket supporting ice cream filled cones in an inverted position when the basket rests upon said tray, said tray being adapted to be depressed for dipping the ice cream filled inverted end of the cones into the coating material in said tank, said basket carrying tray being movable to an elevated position to withdraw the cones from said tank, and releasable means carried by said basket for holding the cones upon said basket and adapted to release said cones for dropping the cones from said basket.

ARCHIE D. CAMPBELL.

References Cited in the file of this patent

UNITED STATES PATENTS

| Number | Name | Date |
|---|---|---|
| 719,896 | Spang | Feb. 3, 1903 |
| 898,584 | La Bau | Sept. 15, 1908 |
| 1,156,319 | Schaub | Oct. 12, 1915 |
| 1,252,226 | Bonk et al. | Jan. 1, 1918 |
| 1,350,984 | Blank et al. | Aug. 24, 1920 |
| 1,467,835 | Buhse | Sept. 11, 1923 |
| 1,686,174 | Rauschenberger | Oct. 2, 1928 |
| 1,739,895 | Gamble | Dec. 17, 1929 |
| 1,927,024 | Cosgrove | Sept. 19, 1933 |
| 2,245,071 | Ewell | June 10, 1941 |
| 2,248,643 | Rasmusson | July 8, 1941 |
| 2,282,661 | Lewis | May 12, 1942 |
| 2,336,649 | Sportolari | Dec. 14, 1943 |
| 2,525,164 | Ackles | Oct. 10, 1950 |